US 6,656,896 B2

(12) United States Patent
Lallier et al.

(10) Patent No.: US 6,656,896 B2
(45) Date of Patent: Dec. 2, 2003

(54) STRIPPING COMPOSITION WHICH CAN BE USED IN PARTICULAR IN THE CONSTRUCTION FIELD

(75) Inventors: Jean-Pierre Lallier, Herblay (FR); Christian Galea, Lyons (FR)

(73) Assignees: Atofina, Puteaux (FR); Licef S.A., Villette d'Anthon (FR)

( * ) Notice: Subject to any disclaimer, the term of this patent is extended or adjusted under 35 U.S.C. 154(b) by 34 days.

(21) Appl. No.: 09/821,795

(22) Filed: Mar. 30, 2001

(65) Prior Publication Data

US 2002/0013241 A1 Jan. 31, 2002

(30) Foreign Application Priority Data

Mar. 30, 2000 (FR) .............................. 00 04036

(51) Int. Cl.$^7$ ................................. C11D 3/44
(52) U.S. Cl. .................. 510/201; 510/202; 510/238; 510/362; 510/365; 510/506; 134/38; 134/39; 134/40
(58) Field of Search ............... 134/38, 39, 40; 510/365, 202, 201, 238, 362, 506

(56) References Cited

U.S. PATENT DOCUMENTS 4,780,235 A * 10/1988 Jackson ....................... 510/212
5,916,860 A *  6/1999 Joye et al. ................... 510/201

FOREIGN PATENT DOCUMENTS

| EP | 0 573 339 A1 | 12/1993 |
| WO | WO 94/24216 | 10/1994 |
| WO | WO 96/30453 | 10/1996 |

* cited by examiner

*Primary Examiner*—Gregory E. Webb
(74) *Attorney, Agent, or Firm*—Millen, White, Zelano & Branigan, P.C.

(57) ABSTRACT

A stripping composition suitable for stripping external organic coatings, such as exterior waterproof coatings and thin films, contains (a): (A) at least one dibasic ester, e.g. aliphatic esters, (B) at least one dipolar aprotic solvent, e.g. dimethyl sulfoxide, (C) at least one cosolvent, e.g. anisole and (D) a combination of softening agents, e.g. a mixture of ethyl lactate, trimethylcyclohexanone, cyclohexyl acetate, diethanolamine, a dimethoxybenzene, and water.

26 Claims, No Drawings

STRIPPING COMPOSITION WHICH CAN BE USED IN PARTICULAR IN THE CONSTRUCTION FIELD

The present invention relates to a stripping composition which can be used in particular in the construction field, especially for the stripping of external organic coatings, such as exterior waterproof coatings and thin films. Exterior waterproof coatings, with a rubbery appearance are impermeable to air, to oxygen, and to water vapour and are based on acrylic or styrene-acrylic polymers.

In the construction field, most paint strippers are based on methylene chloride with methanol added. They can be thickened with cellulose compounds and can comprise an inorganic filler.

However, there is an increasing search to replace methylene chloride because of its very high volatility and very high toxiousness. Replacement products for the synergistic methylene chloride-methanol mixture exist but they are generally much more expensive and form at least 90% by weight of the composition of the formulation. The remaining 10% are composed of a thickener (generally chosen from cellulose or acrylic derivatives), itself generally even more expensive than the solvents, and various additives: activator, surfactant or corrosion inhibitor.

A subject matter of the present invention is thus a stripping composition which can be used in particular in the construction field, especially for the stripping of exterior waterproof coatings and thin films, characterized in that it comprises:

(A) an least one dibasic ester,
(B) at least one dipolar aprotic solvent,
(C) at least one cosolvent, and
(D) a combination of softening agents.

The composition according to the invention can comprise, per 100 parts by weight of (A)+(B)+(C)+(D):

5 to 50, in particular 10 to 45, parts by weight of (A);
10 to 60, in particular 25 to 55, parts by weight of (B);
10 to 50, in particular 15 to 40, parts by weight of (C); and
0.3 to 10, in particular 3 to 10, parts by weight of (D).

The dibasic ester or esters (A) are shown in particular from aliphatic dibasic esters, in particular $C_1$–$C_4$ alkyl diesters of one or more $C_4$–$C_6$ aliphatic dibasic acids. Mention may in particular be made of dimethyl succinate, dimethyl glutarate, dimethyl adipate and their mixtures.

The dipolar aprotic solvents (B) are advantageously chosen from dimethyl sulphoxide, N-methodypryyolidone, propylene carbonate, dimethyl-formamide, acetonitrile, N-methylmorpholine, butyro-lactone and dimethylacetamide. Dimethyl sulphoxide and N-methylpyrrolidone are preferred.

The choice will preferably be made, as cosolvents (C), of monoalkoxybenzenes, such as anisole and phenetole. Use will very particularly be made of phenetole.

According to the present invention, the term "combination of softening agents" preferably denotes a mixture comprising the following compounds: an alkyl lactate, such as ethyl lactate or butyl lactate; trimethylcyclohexanone or isphorone, or cyclohexyl acetate; an ethanolamine, such as monoethanolamino or diethanolamine, or methyldiethenaolamine; 1,2- or 1,3- or 1,4-dimethoxybenzene and water.

Each softening agent can be used in a proportion of at least 0.05 part by weight and preferably 0.5 part by weight per 100 parts by weight of (A)+(B)+(C)+(D).

The stripping composition according to the invention can additionally comprise:

at least one inorganic filler with a thickening nature, in a proportion in particular of 20 to 60 parts by weight, in particular of 25 to 50 parts by weight, per 100 parts by weight of (A)+(B)+(C)+(D), and/or at least one cellulose thickener, in a proportion in particular of 0.05 to 1.5 parts by weight, in particular of 0.5 to 1.1 parts by weight, per 100 parts by weight of (A)+(B)+(C)+(D); and/or at least one dispersing agent, in a proportion in particular of 0.1 to 10 parts by weight, in particular of 0.5 to 2 parts by weight, per 100 parts by weight of (A)+(B)+(C)+(D).

The term "inorganic filler with a thickening nature" is understood to mean a natural or synthetic inorganic powder which can result in formulations for which the viscosity is of the order of 6 000 mPa·s at 20 revolutions/min or 2 000 mPa·s at 100 revolutions/min.

The inorganic filler or fillers generally have a mean particle size of between 0.1 and 200 $\mu$m, more particularly between 1 and 100 $\mu$m. A finer particle size makes it possible to obtain the same viscosity while using less filler, which is not economically desirable.

Mention may be made, as examples of inorganic fillers, or calcium carbonate, silica, calcium phosphite, calcium hydroxide ($Ca(OH)_2$), clay or bentonite.

Mention may be made, as example of cellulose thickener, of Methocell 311, sold by Dow Chemical Co., the process for the preparation of which is disclosed in U.S. Pat. No. 3,388,082, entitled "Hydroxypropyl methyl cellulose ethers".

Mention may be made, as an example of a dispersing agent, of the acidic phosphoric ester of 2-ethylhexanol, sold by Ceca under the name Beycostat A081.

The stripping composition according to the invention can additionally comprise at least one agent which provides it with a pleasant smell, i.e. a perfume in a proportion in particular of 1 to 10 parts by weight per 100 parts by weight of (A)+(B)+(C)+(D).

The stripping composition of the invention has proved to be highly advantageous; this is because, after it has been applied and then left to act for a few tens of minutes, it is sufficient to shift the dry strips using a paint knife. Wet and sticky waste, which is always difficult to remove and to treat, is avoided and most of the time a clean substrate, such as a concrete or brick wall, is obtained.

In the foregoing and in the following examples, all temperatures are set forth uncorrected in degrees Celsius; and, unless otherwise indicated, all parts and percentages are by weight.

In these examples, the ingredients used are as follows:
Dibasic ester:
DBE=dibasic ester having the following composition: (as % by weight):
dimethyl adipate/dimethyl glutarate/dimethyl succinate: 15/62/23, sold by Rhône-Poulenc under the name RPDE.
Polar aprotic solvent: DMSO
Cosolvent: Phenetole
Softening agents: trimethylcyclohexanone, ethyl lactate, cyclohexyl acetate, water, diethanolamine and 1,4-dimethoxybenzene.
Additives:
Cellulose thickener=cellulose thickener sold by Dow Chemical Co. under the name Methocell 311,
Dispersing agent=acidic phosphoric ester of 2-ethylhexanol, sold under the name Beycostat A081.

CaHPO₃=natural calcium phosphite, produced by Ceca.

In these examples, all the proportions cited are in parts by weight.

PREPARATION EXAMPLE 1

The following formulation was prepared by mixing the constituents at ambient temperature.

DMSO . . . 21.9

RDPE . . . 43.8

Phenetole . . . 28.4

Combination of softening agents 4.5
  composed of: trimethylcyclohexanone (0.75), ethyl lactate (0.75), cyclohexyl acetate (0.75), water (0.75), diethanolamine (0.75) and 1,4-dimethoxybenzene (0.75);

Methocell 311 . . . 1

PREPARATION EXAMPLE 2

The entire preparation is carried out at ambient temperature (25° C.) and with stirring (approximately 400 revolutions/min), preferably with a turbine which makes possible dispersion of solids in liquids. The solvents are introduced first. The calcium phosphite and the cellulose thickener are then added.

DMSO . . . 15

RDPE . . . 30

Phenetole . . . 19.5

Combination of softening agents 3
  composed of: trimethylcyclohexanone (0.5), ethyl lactate (0.5), cyclohexyl acetate (0.5), water (0.5), diethanolamine (0.5) and 1,4-dimethoxybenzene (0.5);

Beycostat A81 . . . 1

Methocell 311 . . . 0.7

Calcium phosphite . . . 30.8

Application Example 1

This example relates to the stripping of an exterior waterproof coating with a thickness estimated at 700–800 μm on a smooth concrete substrate. Application is carried out with a rabbit's foot on an external facade (T=12° C.). After an exposure time of 30 minutes, Preparations 1 and 2 lead to easy removal with a scraper, giving dry strips and leaving in place a substrate which is ready for painting. The combination of softening agents thus gives excellent results on waterproof coatings. The waiting time suitable for the diffusion of the stripper is very short (approximately 30 to 40 minutes): it may thus be said that there does not exist a true difference in practice, when stripping a waterproof coating on concrete, between this formula and a conventional chlorinated formula, apart from a much longer opening time, which is beneficial.

Application Example 2

This example relates to the stripping of a thin film on a structured substrate. In this case, the two formulae gave the same performance. The difference from the preceding example is that the film is removed by pressing. A lumpiness effect is not observed, particularly when Preparation 2 (with a filler) is used.

Aside from the above described aspects of the invention, other aspects include, but are not limited to novel intermediate compositions as well as final products which can be derived from the above description. For example, the combination of softening agents, by itself, especially the combination of softening agents described in the preparation examples constitute an aspect of the invention. Likewise, compositions including a combination of one or more of the particular softening agents mentioned above, less than the entire combination of softening agents, with at least one of components (A), (B) and (C), constitutes another aspect of the invention.

Thus, this invention covers not only final stripping solutions, but intermediate compositions for stripping solutions, for example: (A), (B), (C) or (D) in combination with any other of (A), (B), (C) or (D). Examples of such intermediate compositions for stripping solutions or stripping solutions themselves include but are not limited to any of the following combinations (A)+(B); (A)+(C); (A)+(D); (B)+(C); (B)+(C)+(D); (A)+(B)+(D). Also, the specific types of (A), (B), (C) and (D) can be substituted in the aforementioned examples of intermediate compositions and final stripping solutions. For example, there can be used any of the preceding combinations wherein the dibasic ester is dimethyl succinate, dimethyl glutarate, dimethyl adipate or mixtures thereof. Likewise, in any of the preceding combinations wherein the solvent is, for example, dimethyl sulphoxide and the co-solvent is phenetole.

A still further aspect of the invention resides in the process of applying the compositions of the invention to a coating or a thin film in order to remove the coating or film from a substrate.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/04.036, are hereby incorporated by reference.

From the foregoing description, one-skilled in the art can easily ascertain the essential characteristics of this invention, and without departing from the spirit and scope thereof, can make various changes and modifications of the invention to adapt it to various usages and conditions.

What is claimed is:

1. A stripping composition suitable for use in the construction field, comprising on a weight basis:

(A) 5–50 parts of at least one dibasic ester, (B) 10–60 parts of at least one dipolar aprotic solvent, (C) 10–50 parts of at least one cosolvent, and (D) 0.3 to 10 parts of a combination of softening agents.

2. A stripping composition according to claim 1, comprising per 100 parts by weight of (A)+(B)+(C)+(D):

10 to 45 parts by weight of (A), 25 to 55 parts by weight of (B), 15 to 40 parts by weight of (C), and 3 to 10 parts by weight of (D).

3. A stripping composition according to claim 1, wherein the dibasic esters (A) comprise an aliphatic dibasic ester.

4. A stripping composition according to claim 1, wherein the at least one dibasic ester is at least one $C_1$–$C_4$ alkyl diester of one or more $C_4$–$C_6$ aliphatic dibasic acids.

5. A stripping compostion according to claim 3, wherein the dibasic ester or esters (A) are selected from the group consisting of dimethyl succinate dimethyl glutarate, dimethyl adipate and mixtures thereof.

6. A stripping composition according to claim 1, wherein the dipolar aprotic solvent or solvents (B) are selected from the group consisting of dimethyl sulphoxide, N-methylpyrrolidone, propylene carbonate, dimethylformamide, acetonitrile, N-methyl-morpholine, butyrolactone and dimethylacetamide.

7. A stripping composition according to claim 1, wherein the cosolvent (C) is anisole or phenetole.

8. A stripping composition, comprising on a weight basis:
   (A) 5–50 parts of at least one dibasic ester,
   (B) 10–60 parts of at least one dipolar aprotic solvent,
   (C) 10–50 parts of at least one cosolvent, and
   (D) 0.3 to 10 parts of a combination of softening agents wherein the combination of softening agents is a mixture comprising an alkyl lactate, trimethylcyclohexanone or isophorone, cyclohexyl acetate, an ethanolamine, a dimethoxybenzene and water.

9. A stripping composition according to claim 8, wherein the combination of softening agents is a mixture composed of ethyl lactate, trimethylcyclohexanone, cyclohexyl acetate, diethanolamine, 1,4-dimethoxybenzene and water.

10. A stripping composition according to claim 8, wherein each compound is used in a proportion of at least 0.05 part by weight per 100 parts by weight of (A)+(B)+(C)+(D).

11. A stripping composition according to claim 1, additionally comprising at least one additive selected from the group consisting of cellulose thickener in a proportion of 0.05 to 1.1 parts by weight, per 100 parts by weight of (A)+(B)+(C)+(D), at least one inorganic filler in a proportion of 20 to 60 parts by weight, per 100 parts by weight of (A)+(B)+(C)+(D) and at least one dispersing agent, in a proportion of 0.1 to 10 parts per 100 parts by weight of (A)+(B)+(C)+(D).

12. A stripping composition comprising on a weight basis:
   (A) 5–50 parts of at least one dibasic ester,
   (B) 10–60 parts of at least one dipolar aprotic solvent,
   (C) 10–50 parts of at least one cosolvent, and
   (D) 0.3 to 10 parts of a combination of softening agents and a dispersing agent, which is the acidic phosphoric ester of 2-ethylhexanol.

13. A stripping composition comprising on a weight basis:
   (A) 5–50 parts of at least one dibasic ester,
   (B) 10–60 parts of at least one dipolar aprotic solvent,
   (C) 10–50 parts of at least one cosolvent, and
   (D) 0.3 to 10 parts of a combination of softening agents and an inorganic filler, which is calcium phosphite.

14. A stripping composition according to claim 1 additionally comprising at least one perfume in a proportion in particular of 1 to 10 parts by weight per 100 parts by weight of (A)+(B)+(C)+(D).

15. A stripping composition according to claim 5, wherein the dipolar aprotic solvent or solvents (B) are selected from the group consisting of dimethyl sulphoxide, N-methylpyrrolidone, propylene carbonate, dimethylformamide, acetonitrile, N-methyl-morpholine, butyrolactone and dimethylacetamide.

16. A stripping composition according to claim 15, wherein the cosolvent (C) is anisole or phenetole.

17. A stripping composition according to claim 16, wherein the combination of softening agents is a mixture comprising an alkyl lactate, trimethylcyclohexanone or isophorone, cyclohexyl acetate, an ethanolamine, a dimethoxybenzene and water.

18. A stripping composition according to claim 17, wherein the combination of softening agents is a mixture composed of ethyl lactate, trimethylcyclohexanone, cyclohexyl acetate, diethanolamine, 1,4-dimethoxybenzene and water.

19. A stripping composition or intermediate for a stripping composition comprising on a weight basis:
   (A) 5–50 parts of at least one dibasic ester,
   (B) 10–60 parts of at least one dipolar aprotic solvent, and
   (D) 0.3 to 10 parts of a combination of softening agents.

20. A stripping composition or an intermediate for a stripping composition comprising on a weight basis:
   (A) 5–50 parts of at least one dibasic ester,
   (B) 10–60 parts of at least one dipolar aprotic solvent,
   (C) 10–50 parts of at least one cosolvent, and
   (D) 0.3 to 10 parts of a combination of softening agents wherein the combination of softening agents includes at least two softening agents selected from the group consisting of alkyl lactate, trimethylcyclohexanone or isophorone, cyclohexyl acetate, an ethanolamine, a dimethoxybenzene and water.

21. An stripping composition or an intermediate stripping composition comprising on a weight basis:
   (A) 5–50 parts of at least one dibasic ester,
   (B) 10–60 parts of at least one dipolar aprotic solvent,
   (C) 10–50 parts of at least one cosolvent, and
   (D) 0.3 to 10 parts of a combination of softening agents wherein the combination of softening agents includes at least three softening agents selected from the group consisting of ethyl lactate, trimethylcyclohexanone, cyclohexyl acetate, diethanolamine, 1,4-dimethoxybenzene and water.

22. A combination of softening agents comprising a mixture comprising an alkyl lactate, trimethylcyclohexanone or isophorone, cyclohexyl acetate, an ethanolamine, a dimethoxybenzene and water.

23. A combination of softening agents according to claim 22, comprising a mixture comprising ethyl lactate, trimethylcyclohexanone, cyclohexyl acetate, diethanolamine, 1,4-dimethoxybenzene and water.

24. In a process comprising applying a stripping composition to a coating or thin film for the purpose of stripping the coating or film from a substrate, the improvement wherein the stripping composition is in accordance with claim 1.

25. In a process comprising applying a stripping composition to a coating or thin film for the purpose of stripping the coating or film from a substrate, the improvement wherein the stripping composition is in accordance with claim 18.

26. In a process comprising applying a stripping composition to a coating or thin film for the purpose of stripping the coating or film from a substrate, the improvement wherein the stripping composition is in accordance with claim 8.

* * * * *

UNITED STATES PATENT AND TRADEMARK OFFICE
CERTIFICATE OF CORRECTION

PATENT NO. : 6,656,896 B2
DATED : December 2, 2003
INVENTOR(S) : Lallier et al.

It is certified that error appears in the above-identified patent and that said Letters Patent is hereby corrected as shown below:

Column 1,
Line 50, please replace "N-methodypryyolidone" with -- N-methylpyrrolidone --.

Column 5,
Line 1, a comma is missing between "succinate" and "dimethyl glutarate"

Signed and Sealed this

Eighth Day of June, 2004

JON W. DUDAS
*Acting Director of the United States Patent and Trademark Office*